Patented Dec. 27, 1927.

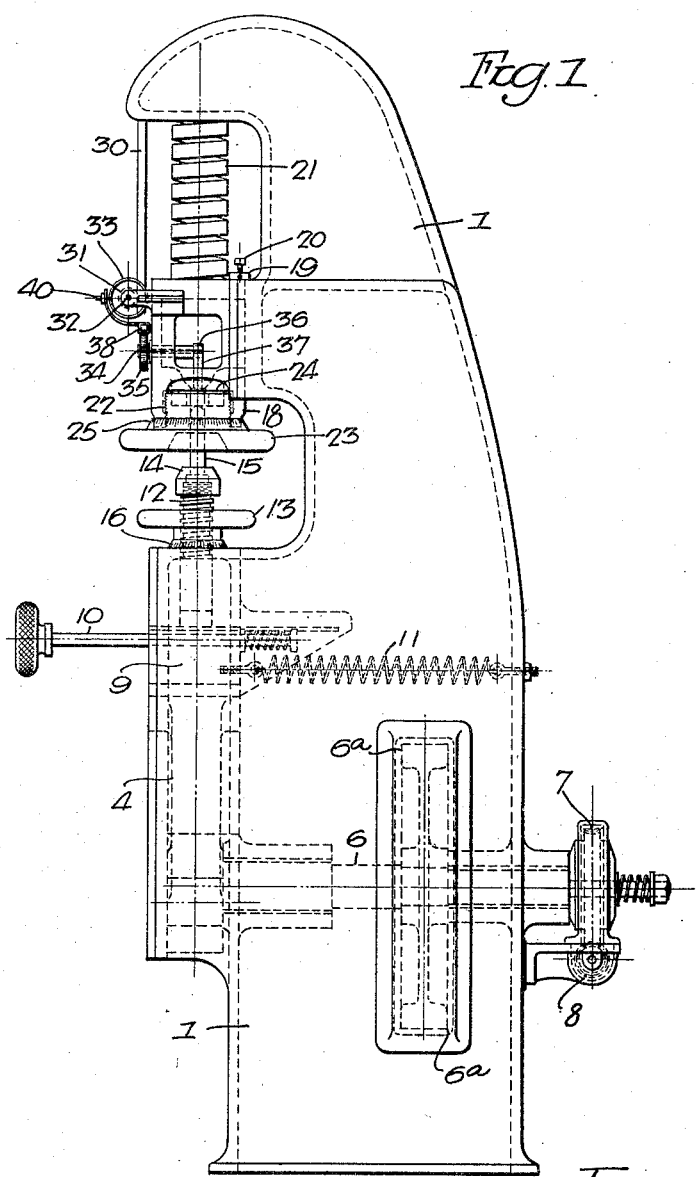

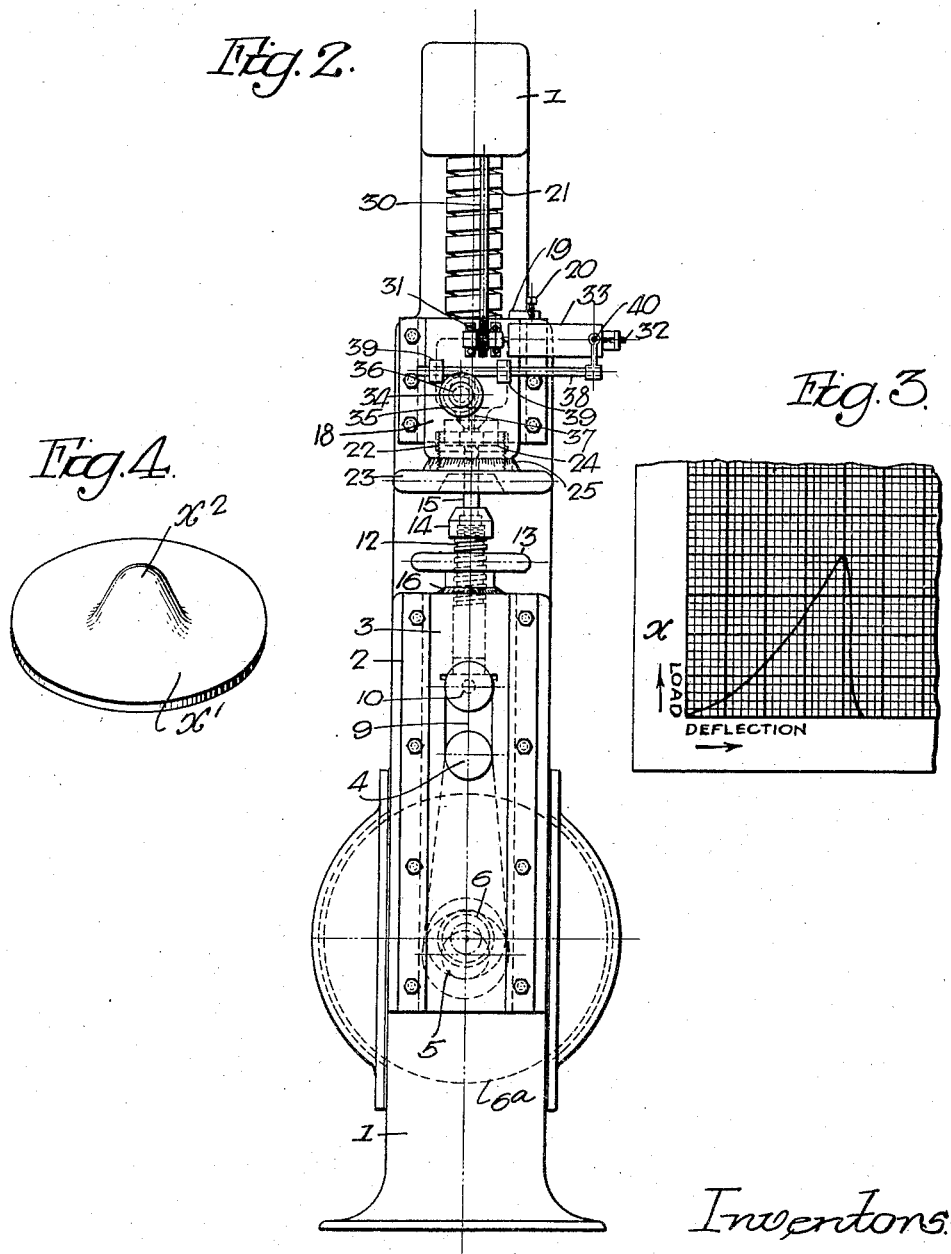

1,653,714

UNITED STATES PATENT OFFICE.

ROBERT B. LEWIS, OF PHILADELPHIA, AND CLIFFORD E. WILLIAMS, OF PALMERTON, PENNSYLVANIA, ASSIGNORS TO TINIUS OLSEN TESTING MACHINE COMPANY, OF PHILADELPHIA, PENNSYLVANIA, A CORPORATION OF PENNSYLVANIA.

DYNAMIC DUCTILITY-TESTING MACHINE.

Application filed June 4, 1921. Serial No. 475,136.

This invention relates to apparatus for testing the ductility of metals, etc., in sheet form and one object thereof is to provide a relatively simple, substantial and accurate apparatus for graphically recording the behavior of a sheet of metal when subjected to a dynamic stress whereby a cup-shaped deformation is produced.

A further object of the invention is to provide novel means for automatically producing a stress-deformation diagram from a test specimen subjected to such a force as will produce a cup-shaped deformation therein;—the various parts being so arranged as to permit of the convenient, rapid and accurate operation of the machine.

These objects and other advantageous ends we attain as hereinafter set forth, reference being had to the accompanying drawings, in which, Figs. 1 and 2 are respectively a side and a front elevation of a testing machine constructed in accordance with our invention;

Fig. 3 is a typical diagram produced by the recording apparatus of our machine; and Fig. 4 is a perspective view of a test sheet, showing it as cupped by the use of our invention.

In the above drawings, 1 represents a suitable frame having in one face a guideway 2 for a cross head 3. The latter is designed to be actuated by a pitman 4 driven from an eccentric 5 on a shaft 6 journalled in the frame 1 and having fixed on it a flywheel 6ª. Said shaft is driven from any suitable source of power, in the present instance through worm gearing 7—8. Operative connection is made between the upper end of the pitman 4 and the cross head 3 by a gag 9 which may be drawn at will between these elements by means of a headed bar 10 and which, under the action of a spring 11, is automatically returned to its inoperative position after the machine has completed one cycle of operations.

The cross head 3 has mounted in its upper end an adjustable stem 12 threaded for the reception of a hand wheel 13 and carrying a chuck 14 whereby a round ended or other suitably formed punching element 15 may be rigidly clamped to it so as to extend in the line of movement of said cross head. A suitable graduated scale 16 is mounted on the hand wheel 13 and is designed to cooperate with a definitely placed reference or zero point on the upper end of the cross head for acurately setting the punch 15.

The frame 1 is overhung above the punch 15 and is provided with a second guideway for a movably supported cross head 18 held in the guides by a suitable projection or lug 19 adjustable by means of a screw 20 and engaging one of the guides of the frame. A suitably calibrated spring 21 acts between the overhung upper end of the frame 1 and the cross head so as to oppose a definite and proportional resistance to its upward movement. The lower face of said cross head 18 has threaded in it a clamping nut 22 adjustable at will by a hand wheel 23 and is formed with a transversely extending slot 24 for the reception of a test specimen in the form of a plate or disc $x^1$ (Fig. 4) of sheet material.

By slacking off the hand wheel 23 the slot 24 is opened sufficiently to permit of the introduction of the test specimen, which may thereafter be loosely clamped or movably held at its edges by the nut 22. The latter is tubular or hollow to permit of the free passage through it of the punch 15 and is circularly graduated as indicated at 25 to cooperate with a suitably placed zero mark on the cross head for the purpose of accurately determining the thickness of the test specimen. The holding device thus provided by the coacting portions of the cross head 18 and nut 22 are designed to approximate or reproduce the conditions existing during the formation of drawn metal articles by means of dies.

Under conditions of operation the shaft 6 is driven at a suitable speed, for example about twenty revolutions per minute, and after a test specimen has been positioned in the cross head 18 as above indicated, the gag 9 is drawn by means of the headed rod 10 into operative position between the upper end of the pitman 4 and the lower cross head 3;—the punch 15 having been previously adjusted by means of the hand wheel 13 so that its upper end will move a predetermined distance above the plane of the lower face of the test specimen. As a result of this operation the cross head 3 is moved upwardly by the pitman 4 and the punch 15 is forced against the test specimen, producing in it an upwardly cupped projection $x^2$. Obviously the force exerted upon the test specimen $x^1$ by the punch is transmitted to the upper cross head 18 and the cupping deformation of said specimen is resisted by the spring 21, which is deflected to a greater or less extent.

In order to obtain a graphic representation of the force exerted upon and the deformation of the test specimen, we may use any of a number of devices, such for example as that shown on the drawings herewith. This device consists of a vertically extending rack 30 whose upper end is fixed to the overhung portion of the top of the frame 1 and whose lower end coacts with a pinion 31 carried on a horizontally extending spindle 32 supported in bearings carried by the cross head 18. Also fixed to this spindle is a drum 33 of suitable construction for the reception of a record receiving sheet.

Also carried by the cross head 18 is a second spindle 34 having fixed to it a gear 35 and a pinion 36, of which the latter has cooperating with it a rack 37 extending vertically in the line of movement of the punch 15 and so positioned that its lower end rests upon the center of the test specimen held by the nut 22. The gear 35 meshes with a third rack 38 mounted to slide longitudinally in bearings 39 projecting from the face of the cross head 18 and at or adjacent one end has a projecting arm carrying a stylus 40 positioned to coact with a record sheet on the drum 33.

Under the conditions of operation above indicated, the upward movement of the cross head 18 due to the force exerted by the punch 15 on the test specimen, causes a deflection of the spring 21 and such movement of the cross head relatively to the frame, through the pinion 31 and rack 30, causes a greater or less rotation of the drum 33. At the same time the upward movement of the central portion of the test specimen as it is cupped by the punch 15, causes an upward movement of the second vertical rack 37 and through the pinion 36 and gear 35, causes the third rack 38 to move longitudinally, so that the stylus 40 is moved in a line parallel with the axis of rotation of the drum. Obviously these two movements, i. e., that of the drum and that of the stylus, take place simultaneously, with the result that there is generated on the record sheet carried by the drum a curve or diagram which in a typical case may have the outline shown in Fig. 3.

If the record sheet be printed with suitable cross section lines and the device be calibrated, it is possible to note from the diagram thus produced not only the stress at which the specimen fractures, but also the deformation corresponding to any dynamic stress from zero up to that necessary to cause fracture. In other words, the machine records graphically the behavior of the test specimen when there is applied to it a sudden load or dynamic stress.

While we preferably employ a punch 15 having a rounded upper end which forms a cup-shaped protrusion or projection in the test specimen, obviously if desired, punches or other forms may be used. We have therefore employed the term "cupping" to describe the operation of forming in a sheet of material to be tested a cup-shaped or other equivalent deformation whose dimensions shall be a measure of the ductility of the material tested under predetermined conditions of stress.

We claim:

1. The combination in a ductility testing machine of a supporting structure; two cross heads movably carried thereby; means for holding a test specimen in one of said cross heads; a spring resisting movement of said cross head; a punch mounted on the second cross head; a pitman actuated from a source of power; and a gag movable at will to operatively connect the pitman and the second cross head to cause the punch to indent the test specimen.

2. The combination in a ductility testing machine of a supporting structure; two cross heads movably mounted on said structure; a spring resisting movement of one of said cross heads; means for holding a test specimen to said cross head; a punch carried by the second cross head and adjustable therein to vary the distance of its free end from the test specimen; and means for connecting the second cross head to a source of power.

3. The combination in a ductility testing machine of a supporting structure; a relatively movable member thereon for holding a test specimen; a cross head movably mounted on the supporting structure; a punch carried by said cross head for acting on the test specimen; a shaft journalled on the supporting structure and connected to a source of power; a fly wheel on the shaft; and means for operatively connecting said shaft at will to the cross head to cause the punch to indent the test specimen; with a recording device connected to a specimen holding member.

4. The combination in a ductility testing machine of means for cupping a test specimen, said means including a movable structure for supporting said test specimen; and a device for graphically recording the force applied to and the resulting deformation of said specimen, said device comprising means responsive to the movement of said structure and the deformation of said specimen.

5. The combination in a ductility testing machine of means for at least cupping a test specimen; and means for recording the behavior of such specimen under testing conditions, said means including an element responsive to the cupped portion of the test specimen.

6. The combination in a ductility testing machine of means for producing a cup-shaped deformation of a test specimen including a movable structure supporting the latter; and a recording device including elements actuated respectively by the deformed portion of the test specimen and by the structure supporting the same.

7. The combination in a ductility testing machine of a device for cupping a test specimen including a movable cross head supporting the latter; and a spring mounted to oppose movement of the cross head; with a recording device including a drum and a stylus of which one is actuated by movement of the cross head and the other is actuated by the test specimen.

8. The combination in a ductility testing machine of a supporting structure; a cross head movably mounted therein; means for holding a test specimen to said cross head; a spring mounted to oppose movement of the cross head; means including a punch for applying a dynamic cupping stress to the specimen; a record carrying drum; mechanism for causing said drum to be rotated by a movement of the cross head; a stylus operative on a record sheet carried by the drum; and means for causing said stylus to be moved by the cupped portion of the material of the test sheet during its formation.

ROBERT B. LEWIS.
CLIFFORD E. WILLIAMS.